United States Patent

Yanai et al.

[11] Patent Number: 6,045,594
[45] Date of Patent: Apr. 4, 2000

[54] METHOD OF MANUFACTURING NONAQUEOUS ELECTROLYTE BATTERY

[75] Inventors: Atsushi Yanai, Minoo; Katsunori Yanagida, Itami; Yoshito Chikano, Katano; Ikuo Yonezu, Hirakata; Koji Nishio, Hirakata, all of Japan

[73] Assignee: Sanyo Electric Co. Ltd., Osaka, Japan

[21] Appl. No.: 09/256,778

[22] Filed: Feb. 24, 1999

[30] Foreign Application Priority Data

Feb. 25, 1998 [JP] Japan ................... 10-043579
Mar. 6, 1998 [JP] Japan ................... 10-055263

[51] Int. Cl.$^7$ ............................... H01M 10/40
[52] U.S. Cl. ........................... 29/623.1; 429/324
[58] Field of Search ................ ; 29/623.1; 429/324; H01M 10/40

[56] References Cited

U.S. PATENT DOCUMENTS 5,474,862 12/1995 Okuno et al. ................ 429/197
5,484,669 1/1996 Okuno et al. ................ 429/194

FOREIGN PATENT DOCUMENTS

| 5-6779 | 1/1993 | Japan . |
| 5-6780 | 1/1993 | Japan . |
| 5-47416 | 2/1993 | Japan ............ H01M 10/40 |
| 5-182689 | 7/1993 | Japan . |

*Primary Examiner*—John S. Maples
*Attorney, Agent, or Firm*—Kubovcik & Kubovcik

[57] ABSTRACT

A method is disclosed for manufacturing a nonaqueous battery which includes a negative electrode containing lithium or a material capable of occluding and discharging lithium, a positive electrode containing an oxide of manganese or cobalt, and a nonaqueous electrolyte. In the method the nonaqueous electrolyte is treated with an oxide of the metal of the positive electrode before the nonaqueous electrolyte is assembled into the battery. The method provides a nonaqueous electrolyte battery having an improved self-discharge property.

12 Claims, 1 Drawing Sheet

METHOD OF MANUFACTURING NONAQUEOUS ELECTROLYTE BATTERY

FIELD OF THE INVENTION

The present invention relates to a method of manufacturing a nonaqueous electrolyte battery. Specifically, this invention provides an improvement in the storage property of a nonaqueous electrolyte battery in which manganese oxide or cobalt oxide is a positive electrode material and lithium is a negative electrode active material.

BACKGROUND OF THE INVENTION

Nonaqueous electrolyte batteries which use lithium as the negative electrode active material have lately attracted attention as high energy density batteries, and much active research is being conducted.

As a solvent of the nonaqueous electrolyte for these types of batteries, ethylene carbonate, propylene carbonate, butylene carbonate, dimethyl carbonate, diethyl carbonate, sulfolane, dimethoxy ethane, tetrahydrofuran and dioxolane and the like can be used alone or in the form of a mixture of two or more of these substances. As a solute dissolved in the solvent there can be mentioned $LiPF_6$, $LiBF_4$, $LiClO_4$, $LiCF_3SO_3$, $LiAsF_6$, $LiN(CF_3SO_2)_2$, $LiCF_3(CF_2)_3SO_3$ and the like.

Among the nonaqueous electrolyte batteries, one in which a manganese oxide is used as a positive electrode material is attractive because of the possibility of reduction of cost of the positive electrode. As a manganese oxide used as a positive electrode material, there can be mentioned $MnO_2$, $LiMn_2O_4$, $LiMnO_2$ and the like. A cobalt oxide is also a conventional active material of a positive electrode. As a typical cobalt oxide used as the positive electrode, $LiCoO_2$ can be mentioned.

However, a battery which uses a manganese oxide or a cobalt oxide as a positive electrode material causes a problem that manganese or cobalt: is eluted into an electrolyte from the positive electrode material, i.e., the manganese oxide or the cobalt oxide, respectively, during charge-discharge cycle or storage, and battery properties, especially storage property, are deteriorated.

It has been proposed to add an aliphatic carboxylic acid or a chain aliphatic carboxylate to an electrolyte to improve the storage property (Japanese Patent Laid-Open Publication No. Hei 5-182689). It has also been proposed to add cerium or yttrium to cobalt oxide of the material of the positive electrode (Japanese Patent Laid-Open Publication No. Hei 5-6779 or Hei 5-6780, respectively).

However, these proposals have still not been satisfactory to solve a problem of self-discharge of a battery. This is because an additive to the electrolyte or additive to the positive material cannot inhibit elution of manganese or cobalt from the positive electrode.

OBJECT OF THE INVENTION

An object of the present invention is to provide an excellent method of manufacturing a non-aqueous electrolyte battery which results in reduced self-discharge during storage of the nonaqueous electrolyte battery and thereby in improved self-discharge. The method inhibits the elution of an active material of the positive electrode, i.e., a manganese oxide or cobalt oxide, into the electrolyte.

SUMMARY OF THE INVENTION

The present invention provides a method for manufacturing a non-aqueous electrolyte battery having a negative electrode comprising lithium or a material capable of occluding and discharging lithium ion, a positive electrode comprising manganese oxide or cobalt oxide capable of occluding and discharging lithium ion, and a non-aqueous electrolyte, wherein the nonaqueous electrolyte is treated with manganese oxide or cobalt oxide before being assembled in the battery.

It is also possible that manganese or cobalt is preliminary dissolved into the nonaqueous electrolyte, and the nonaqueous electrolyte including manganese ion or cobalt ion can be injected into the battery. The electrolyte can be poured into a battery can, for example, a positive can or a negative can, or can be impregnated into a separator, to be assembled into a battery.

As described above, the nonaqueous electrode containing manganese ion or cobalt ion makes it possible to prohibit elution of manganese ion or cobalt ion from the positive electrode material.

Manganese oxide, for example, lithium containing manganese dioxide ($LiMnO_2$), spinel manganese dioxide ($LiMn_2O_4$), or manganese dioxide can be used as a material to be immersed in the nonaqueous electrolyte before assembly of the battery. It is most preferable to use the same manganese oxide as the positive electrode to avoid contamination of the battery with impurities.

$LiCoO_2$ and $Co_3O_4$ can be used as a cobalt oxide to be immersed in the nonaqueous electrolyte. It is also most preferable to use the same cobalt oxide as the positive electrode to avoid contamination of the battery with impurities.

It is preferable that cobalt is contained in the nonaqueous electrolyte as a cobalt complex, for example, $[Co(NH_3)_6]^{3+}$, $[Co(CO)_4]^-$ or the like.

It is preferable that the nonaqueous electrolyte contains 1~100 ppm of manganese ion or cobalt ion to minimize self-discharge of a battery.

As a solute dissolved in the solvent, $LiPF_6$, $LiBF_4$, $LiSbF_6$, $LiAsF_6$, $LiCF_3SO_3$, $LiN(CF_3SO_2)_2$, $LiC(CF_3SO_2)_3$, $LiCF_3(CF_2)_3SO_3$ or the like can be used alone or in the form of a mixture of two or more of these solutes.

As the solvent comprising the electrolyte, there can be used ethylene carbonate, propylene carbonate, butylene carbonate, dimethyl carbonate, diethyl carbonate, methyl ethyl carbonate, sulfolane, 3-methyl sulfolane, 1,2-dimethoxy ethane, tetrahydrofuran, 2-methyl tetrahydrofuran and 1,3-dioxolane alone or as a mixture of two or more of these. The solvent, of course, is not limited to these.

The negative electrode for this battery is lithium, a lithium alloy or a material capable of occluding and discharging lithium ion, for example, lithium-aluminum alloy, a carbon material (for example, coke or graphite) and the like.

Figure 1:
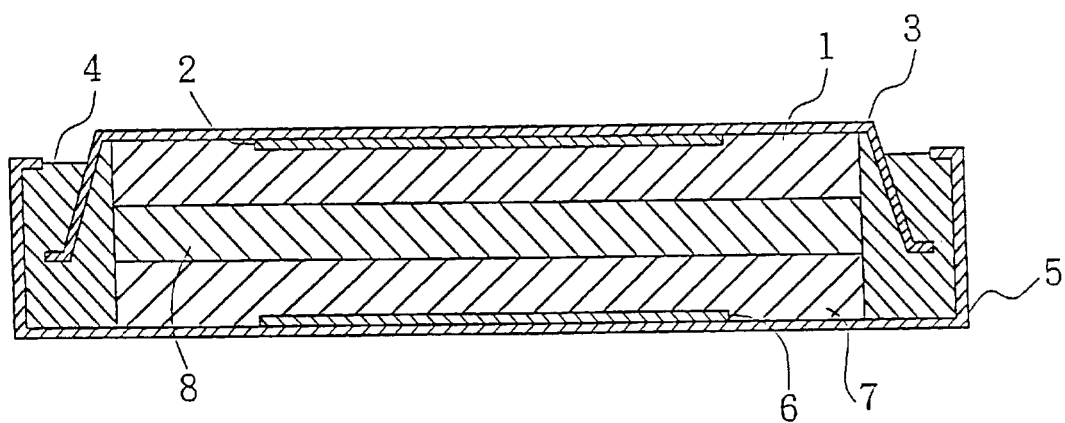
FIG. 1 is a sectional view of a nonaqueous electrolyte battery.

1 a negative electrode
2 a negative electrode collector
3 a negative can
4 an insulating packing
5 a positive can
6 a positive electrode collector
7 a positive electrode
8 a separator

DESCRIPTION OF PREFERRED EMBODIMENT

The present invention is described below in detail with reference to the drawing.

EXAMPLE 1

FIG. 1 is a sectional view of a coin-shaped nonaqueous electrolyte battery as an embodiment of the present invention. Negative electrode (1) comprising lithium-aluminum metal was press bonded to the inside surface of negative electrode collector (2). Negative electrode collector (2) is made of ferrite stainless steel (SUS430) and was secured to the bottom of negative can (3) which is C-shaped in section. The edge of negative can (3) was secured in insulating packing (4) made of polypropylene. The outer edge of insulating packing (4) was covered by positive can (5) which is C-shaped in section. Positive electrode collector (6) was secured to the bottom of positive can (5). Positive electrode (7) was secured to the inside of positive electrode collector (6). Separator (8) injected and impregnated with a nonaqueous electrolyte prepared as described below was located between positive electrode (7) and negative electrode (1). A battery having an outer diameter of 20.0 mm and a thickness of 2.5 mm was prepared.

The positive electrode was prepared by mixing $LiMn_2O_4$ as an active material of the positive electrode, carbon powder as an electrically conducting agent and fluoro resin powder as a binder, at a ratio of 85:10:5 by weight. The mixture was press formed, and dried at a temperature of 150° C.

The negative electrode was prepared by cutting a pressed lithium-aluminum alloy sheet to a predetermined size.

A nonaqueous electrolyte was prepared as follows. $LiPF_6$ as an electrolytic solute was dissolved at a ratio of 1 mol/l in a mixture of ethylene carbonate (EC) and diethyl carbonate (DEC) at a ratio 5:5 by weight. A manganese oxide, $LiMn_2O_4$, 440 mesh pass powder was immersed in the solvent mixture for 15 hours, and was separated from the electrolyte by filtration. The nonaqueous electrolyte contained 5 ppm of manganese ion.

The electrolyte was injected into the battery, and the battery was sealed to prepare the battery (A1).

EXAMPLE 2

A battery (A2) of the present invention was prepared in the same manner as Example 1 except that $MnO_2$ was used to treat the electrolyte instead of $LiMn_2O_4$. Manganese ion concentration in the nonaqueous electrolyte was 5 ppm.

COMPARATIVE EXAMPLE 1

A battery (X1) was prepared in the same manner as Example 1 except that no manganese oxide was immersed in the mixture of EC and DEC. Therefore, manganese ion concentration of the electrolyte was 0 ppm.

COMPARATIVE EXAMPLE 2

A battery (X2) was prepared in the same manner as Comparative Example 1 except that ethylene carbonate (EC) and methyl butyrate (MB) were mixed at a ratio 3:7 by weight. An aliphatic carboxylate, i.e., methyl butyrate, was used as disclosed in the Japanese Patent Laid-Open Publication No. Hei 5-182689).

STORAGE PROPERTY TEST

Each battery was charged at 10 mA of a charging current up to 4.2 V and then was discharged to 3.0 V using 1 kΩ resistance. A temperature was maintained at 25° C. during charge and discharge procedure. Discharge capacity of this first cycle was defined as the initial discharge capacity.

Each battery was charged under the same condition as the first charge, and was stored at 80° C. for two months. After storage, each battery was discharged under the same condition as the first discharge and discharge capacity after storage was obtained. The self-discharge rate was calculated according to the following formula.

Self-discharge rate (%)=(1-discharge capacity after storage/initial discharge capacity)×100

Results are shown in Table 1.

TABLE 1

| Battery | Positive Electrode Material | Treatment of Electrolyte | Component of Electrolyte | Mn ion Concentration | Self-discharge rate |
|---|---|---|---|---|---|
| A1 | $LiMn_2O_4$ | $LiMn_2O_4$ immersion | EC/DEC(5:5) | 5 ppm | 5% |
| A2 | $LiMn_2O_4$ | $MnO_2$ immersion | EC/DEC(5:5) | 5 ppm | 7% |
| X1 | $LiMn_2O_4$ | — | EC/DEC(5:5) | 0 | 21% |
| X2 | $LiMn_2O_4$ | — | EC/MB(3:7) | 0 | 20% |

Batteries A1 and A2, which used the electrolytes treated with the manganese oxide before assembling of the batteries, had inhibited self-discharge as compared to batteries X1 and X2, in which the electrolytes were not treated with a manganese oxide.

It is believed that these results were obtained because elution of manganese ion into the electrolyte in the batteries of the invention was inhibited.

EXAMPLE 3

Batteries (B1 and B2) of the present invention were prepared in the same manner as Examples 1 and 2, respectively, except that $MnO_2$ was used as an active material of the positive electrode.

COMPARATIVE EXAMPLES 3 AND 4

Batteries (Y1 and Y2) were prepared in the same manner as Comparative Examples 1 and 2, respectively, except that $MnO_2$ was used as an active material of the positive electrode.

Storage property of batteries B1, B2, Y1 and Y2 were tested as described above.

Results are shown in Table 2.

TABLE 2

| Battery | Positive Electrode Material | Treatment of Electrolyte | Component of Electrolyte | Mn ion Concentration | Self-discharge rate |
|---|---|---|---|---|---|
| B1 | $MnO_2$ | $LiMn_2O_4$ immersion | EC/DEC(5:5) | 5 ppm | 9% |
| B2 | $MnO_2$ | $MnO_2$ immersion | EC/DEC(5:5) | 5 ppm | 6% |
| Y1 | $MnO_2$ | — | EC/DEC(5:5) | 0 | 23% |
| Y2 | $MnO_2$ | — | EC/MB(3:7) | 0 | 22% |

Batteries B1 and B2, which used the electrolytes treated with the manganese oxide before assembling of the batteries, had inhibited self-discharge as compared to batteries Y1 and Y2, in which the electrolytes were not treated with a manganese oxide.

When the same manganese oxide as the active material of the positive electrode was dipped into the electrolyte, lower self-discharge rates were obtained (see the self-discharge rate of A1 and B2 in Tables 1 and 2, respectively). The same manganese oxide as an active material of a positive electrode immersed in an electrolyte is desirable.

EXAMPLE 4

The way in which the concentration of manganese ion in an electrolyte affects a self-discharge rate was studied as follows:

Concentration of manganese ion in the electrolyte was controlled by length of time that a manganese oxide was immersed in the electrolyte.

Results are shown in Table 3.

TABLE 3

| Battery | Mn ion Concentration (ppm) | Self-discharge rate (%) |
|---|---|---|
| X1 | 0 | 21 |
| C1 | 0.5 | 14 |
| C2 | 1 | 9 |
| A1 | 5 | 5 |
| C3 | 10 | 6 |
| C4 | 50 | 8 |
| C5 | 70 | 9 |
| C6 | 100 | 10 |
| C7 | 110 | 14 |
| C8 | 150 | 15 |

Improvements of self-discharge rate were observed at all concentrations of manganese ion that were studied. However, 0.5~110 ppm of a manganese ion concentration of the electrolyte is preferable to substantially inhibit self-discharge rate. 1~100 ppm of a manganese ion concentration of the electrolyte is more preferable.

EXAMPLE 5

A battery of the present invention (CA1) was prepared in the basically same manner as Example 1.

A positive electrode was prepared by mixing $LiCoO_2$ as an active material of the positive electrode, carbon powder as an electrically conducting agent and fluoro resin as a binder, at a ratio of 80:10:10 by weight. The mixture was press formed, and dried at a temperature of 100° C. for 2 hours in a vacuum.

A nonaqueous electrolyte was prepared as follows. $LiPF_6$ as an electrolytic solute was dissolved at a ratio of 1 mol/l in a mixture of ethylene carbonate (EC) and diethyl carbonate (DEC) at a ratio 5:5 by weight. A cobalt oxide, $LiCoO_2$, 440 mesh pass powder was immersed in the solvent mixture for 15 hours, and was separated from the electrolyte by filtration. The nonaqueous electrolyte contained 5 ppm of cobalt ion.

EXAMPLE 6

A battery of the present invention (CA2) was prepared in the same manner as Example 5 except that $Co_3O_4$ was used to prepare the nonaqueous electrolyte instead of $LiCoO_2$.

COMPARATIVE EXAMPLE 5

A battery (CX1) was prepared in the same manner as Example 5 except that a cobalt oxide was not immersed in the mixture of EC and DEC. Therefore, cobalt ion concentration of the electrolyte was 0 ppm.

COMPARATIVE EXAMPLE 6

A battery (CX2) was prepared in the same manner as Comparative Example 5 except that 10 mol % of cerium (Ce) was added to the positive electrode material. Addition of cerium is disclosed in Japanese Patent Laid-Open Publication No. Hei 5-6779.

COMPARATIVE EXAMPLE 7

A battery (CX3) was prepared in the same manner as Comparative Example 5 except that 10 mol % of yttrium (Y) was added to the positive electrode material. Addition of yttrium is disclosed in Japanese Patent Laid-Open Publication No. Hei 5-6780.

Each battery CA1, CA2, CX1, CX2 and CX3 was tested of storage property in the same manner as Example 1.

Results are shown in Table 4.

TABLE 4

| Battery | Positive Electrode Material | Treatment of Electrolyte | Component of Electrolyte | Co ion Concentration | Self-discharge rate |
|---|---|---|---|---|---|
| CA1 | $LiCoO_2$ | $LiCoO_2$ immersion | EC/DEC(5:5) | 5 ppm | 5% |
| CA2 | $LiCoO_2$ | $Co_3O_4$ immersion | EC/DEC(5:5) | 5 ppm | 7% |
| CX1 | $LiCoO_2$ | — | EC/DEC(5:5) | 0 | 23% |
| CX2 | Ce added $LiCoO_2$ | — | EC/DEC(5:5) | 0 | 20% |
| CX3 | Y added $LiCoO_2$ | — | EC/DEC(5:5) | 0 | 22% |

EXAMPLE 7

The way in which the concentration of cobalt ion in an electrolyte affected a self-discharge rate was studied as follows:

Batteries (CB1~CB8) were prepared in the same manner as Example 5 except that the electrolytes had different cobalt ion concentrations by control of length of time that a cobalt oxide, $LiCoO_2$, was immersed in the electrolyte.

Results are shown in Table 5. Results obtained for batteries CA1 and CX1 are included in Table 5.

TABLE 5

| Battery | Co ion Concentration (ppm) | Self-discharge rate (%) |
|---|---|---|
| CX1 | 0 | 23 |
| CB1 | 0.5 | 12 |
| CB2 | 1 | 10 |
| CA1 | 5 | 5 |
| CB3 | 10 | 7 |
| CB4 | 50 | 8 |
| CB5 | 70 | 10 |
| CB6 | 100 | 11 |
| CB7 | 110 | 12 |
| CB8 | 150 | 15 |

Improvements of self-discharge rate were observed at all concentrations of cobalt ion that were studied. However, 0.5~110 ppm of a cobalt ion concentration of the electrolyte is preferable to substantially inhibit self-discharge rate. 1~100 ppm of the cobalt ion concentration of the electrolyte is more preferable.

EXAMPLE 8

Batteries (DA1 and DA2) were prepared in the same manner as Examples 5 and 6, respectively, except that ammonia gas was bubbled during immersion of cobalt oxide in the electrolyte.

Batteries (DA3 and DA4) were prepared in the same manner as Examples 5 and 6, respectively, except that carbon monoxide was bubbled during immersion of cobalt oxide in the electrolyte. Results are shown in Table 6.

TABLE 6

| Battery | Treatment of Electrolyte | Co ion Concentration | Self-discharge rate |
|---------|--------------------------|----------------------|---------------------|
| DA1 | $LiCoO_2$ immersion $NH_3$ bubbling | 5 ppm | 3% |
| DA2 | $Co_3O_4$ immersion $NH_3$ bubbling | 5 ppm | 5% |
| DA3 | $LiCoO_2$ immersion CO bubbling | 5 ppm | 4% |
| DA4 | $Co_3C_4$ immersion CO bubbling | 5 ppm | 4% |
| CA1 | $LiCoO_2$ immersion | 5 ppm | 5% |
| CA2 | $Co_3O_4$ immersion | 5 ppm | 7% |

Batteries prepared by using a bubbling gas, i.e., ammonia gas or carbon monoxide, had improved self-discharge rate. Cobalt ion formed a cobalt complex, $[Co(NH_3)_6]^{3+}$ or $[Co(CO)_4]^-$, and cobalt ion was not reduced on the surface of the negative electrode during discharge. It is believed that cobalt ion is stabilized in the form of a cobalt complex in the electrolyte to contribute to improved self-discharge rate.

ADVANTAGE OF THE INVENTION

The present invention improves self-discharge during storage of a battery having a positive electrode containing a manganese oxide or cobalt oxide as an active material of the positive electrode. The invention makes it possible to maintain a high capacity for a long period, and is very valuable industrially.

What is claimed is:

1. A method of manufacturing a nonaqueous battery comprising a negative electrode containing lithium or a material capable of occluding and discharging lithium, a positive electrode containing an oxide of a metal, wherein the oxide consists essentially of an oxide of a metal selected from the group consisting of manganese and cobalt, and a nonaqueous electrolyte, comprising treating the nonaqueous electrolyte with an oxide of the metal of the positive electrode before the nonaqueous electrolyte is assembled into the battery.

2. A method of manufacturing a nonaqueous battery according to claim 1, wherein a manganese oxide is immersed in the nonaqueous electrolyte until manganese ion concentration reaches a predetermined amount.

3. A method of manufacturing a nonaqueous battery according to claim 1, wherein a manganese oxide used for treatment of the nonaqueous electrolyte is $LiMn_2O_4$ or $MnO_2$.

4. A method of manufacturing a nonaqueous battery according to claim 1, wherein a cobalt oxide used for treatment of the nonaqueous electrolyte is $LiCoO_2$ or $Co_3O_4$.

5. A method of manufacturing a nonaqueous battery according to claim 1, wherein a manganese or cobalt ion concentration of the nonaqueous electrolyte following said treatment is in a range of 1~100 ppm.

6. A method of manufacturing a nonaqueous battery according to claim 1, wherein the nonaqueous electrolyte contains cobalt in the form of a cobalt complex, $[Co(NH_3)_6]^{3+}$ or $[Co(CO)_4]^-$.

7. A method of manufacturing a nonaqueous battery according to claim 6, wherein ammonia gas or carbon monoxide is bubbled into said electrolyte during said treatment.

8. A method of manufacturing a nonaqueous battery comprising a negative electrode containing lithium or a material capable of occluding and discharging lithium, a positive electrode containing an oxide of a metal, wherein the oxide consists essentially of an oxide of a metal selected from the group consisting of manganese and cobalt, and a nonaqueous electrolyte, wherein a metal of the positive electrode is dissolved in the nonaqueous electrolyte and subsequently the nonaqueous electrolyte is injected into the battery.

9. A method of manufacturing a nonaqueous battery according to claim 8, wherein the manganese oxide is $LiMn_2O_4$ or $MnO_2$.

10. A method of manufacturing a nonaqueous battery according to claim 8, wherein a manganese ion concentration of the nonaqueous electrolyte is in a range of 1~100 ppm.

11. A method of manufacturing a nonaqueous battery according to claim 8, wherein the cobalt oxide is $LiCoO_2$ or $Co_3O_4$.

12. A method of manufacturing a nonaqueous battery according to claim 8, wherein the nonaqueous electrolyte contains cobalt in the form of a cobalt complex, $[Co(NH_3)_6]^{3+}$ or $[Co(CO)_4]^-$.

* * * * *